US011360812B1

(12) United States Patent
Kumar

(10) Patent No.: US 11,360,812 B1
(45) Date of Patent: Jun. 14, 2022

(54) OPERATING SYSTEM APPARATUS FOR MICRO-ARCHITECTURAL STATE ISOLATION

(71) Applicant: Apple Inc., Cupertino, CA (US)

(72) Inventor: Derek R. Kumar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 220 days.

(21) Appl. No.: 16/723,418

(22) Filed: Dec. 20, 2019

Related U.S. Application Data

(60) Provisional application No. 62/784,144, filed on Dec. 21, 2018.

(51) Int. Cl.
*G06F 9/48* (2006.01)
*G06F 9/38* (2018.01)
(Continued)

(52) U.S. Cl.
CPC .......... *G06F 9/4881* (2013.01); *G06F 9/3005* (2013.01); *G06F 9/3838* (2013.01); *G06F 9/3842* (2013.01); *G06F 12/0891* (2013.01)

(58) Field of Classification Search
CPC .... G06F 9/4881; G06F 9/3005; G06F 9/3838; G06F 9/3842; G06F 9/3844; G06F 9/3846; G06F 9/3848; G06F 9/30178; G06F 9/45533; G06F 9/37; G06F 9/4843; G06F 21/33; G06F 21/64; G06F 21/564; G06F 21/6209; G06F 21/126; G06F 21/50; G06F 21/6281; G06F 21/725; G06F 21/74;

(Continued)

(56) References Cited

U.S. PATENT DOCUMENTS 8,285,987 B1 * 10/2012 Kimball ................. G06F 21/14
726/26
8,621,238 B1 * 12/2013 Kimball ................. G06F 21/51
712/228

(Continued)

FOREIGN PATENT DOCUMENTS

WO WO-2016178816 A1 * 11/2016 ............. G06F 21/44

OTHER PUBLICATIONS

Wikipedia: Tablet Computer, pp. 10, 11 (https://en.wikipedia.org/wiki/Tablet_computer) (Year: 2021).*

(Continued)

*Primary Examiner* — Eric Coleman
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to preventing a process from using state information to control a flow of execution of different process. Accordingly, a processor of a computing device may execute a first process and store state information usable to facilitate speculative execution of that first process. An operating system of the computing device may determine whether the first process is trusted by the operating system. The operating system may further schedule a second process for execution of the processor after executing the first process. In response to determining that the first process is not trusted, the operating system may cause the processor to execute one or more instructions before executing the second process. These one or more instructions may prevent the stored state information of the first process from affecting execution of the second process.

20 Claims, 6 Drawing Sheets

(51) Int. Cl.
*G06F 12/0891* (2016.01)
*G06F 9/30* (2018.01)

(58) Field of Classification Search
CPC ............... G06F 2201/83; G06F 16/152; G06F 12/0891; G06F 2211/009
USPC ............ 718/102–108; 726/4–7, 8, 9, 10, 14, 726/22–29; 380/277–286; 705/317; 713/155–158, 172, 173, 175–180
See application file for complete search history.

(56) References Cited

U.S. PATENT DOCUMENTS

| | | | | |
|---|---|---|---|---|
| 9,003,475 | B1* | 4/2015 | Jaiswal | G06F 21/50 |
| | | | | 726/1 |
| 9,058,483 | B2* | 6/2015 | Chen | G06F 21/51 |
| 9,367,328 | B2* | 6/2016 | Nemiroff | G06F 21/561 |
| 9,613,081 | B1* | 4/2017 | Harman | G06F 21/64 |
| 9,824,225 | B1* | 11/2017 | Polansky | G06F 9/5077 |
| 10,116,436 | B1* | 10/2018 | Kodalapura | G06F 21/52 |
| 10,397,230 | B2* | 8/2019 | Callaghan | H04L 63/0815 |
| 10,642,744 | B2* | 5/2020 | Boggs | G06F 12/0811 |
| 10,831,491 | B2* | 11/2020 | Sukhomlinov | G06F 9/3806 |
| 11,119,784 | B2* | 9/2021 | Branco | G06F 9/3836 |
| 2009/0089564 | A1* | 4/2009 | Brickell | G06F 9/30003 |
| | | | | 712/E9.045 |
| 2013/0312099 | A1* | 11/2013 | Edwards | G06F 21/554 |
| | | | | 726/24 |
| 2014/0019738 | A1* | 1/2014 | Kataoka | G06F 9/3806 |
| | | | | 712/240 |
| 2014/0032912 | A1* | 1/2014 | Hardy | H04N 1/32144 |
| | | | | 713/176 |
| 2014/0136838 | A1* | 5/2014 | Mossbarger | H04L 9/3263 |
| | | | | 713/156 |
| 2014/0372999 | A1* | 12/2014 | Becker | G06F 21/572 |
| | | | | 717/169 |

OTHER PUBLICATIONS

Alex Biryukov, et al., "Side-Channel Attacks meet Secure Network Protocols (Full Version)*," Conference paper, First Online: Jun. 26, 2017, part of the Lecture Notes in Computer Science book series (LNCS, vol. 10355), 27 pages.

Moritz Lipp, et al., "Meltdown," Cornell University, submitted on Jan. 3, 2018, 16 pages.

Paul Kocher, et al., "Spectre Attacks: Exploiting Speculative Execution," Cornell University, submitted on Jan. 3, 2018, 19 pages.

Tawalbeh, et al., "Trust delegation-based secure mobile cloud computing framework," Int. J. Information and Computer Security, vol. 9, Nos. 1/2, 2017, pp. 36-48.

* cited by examiner

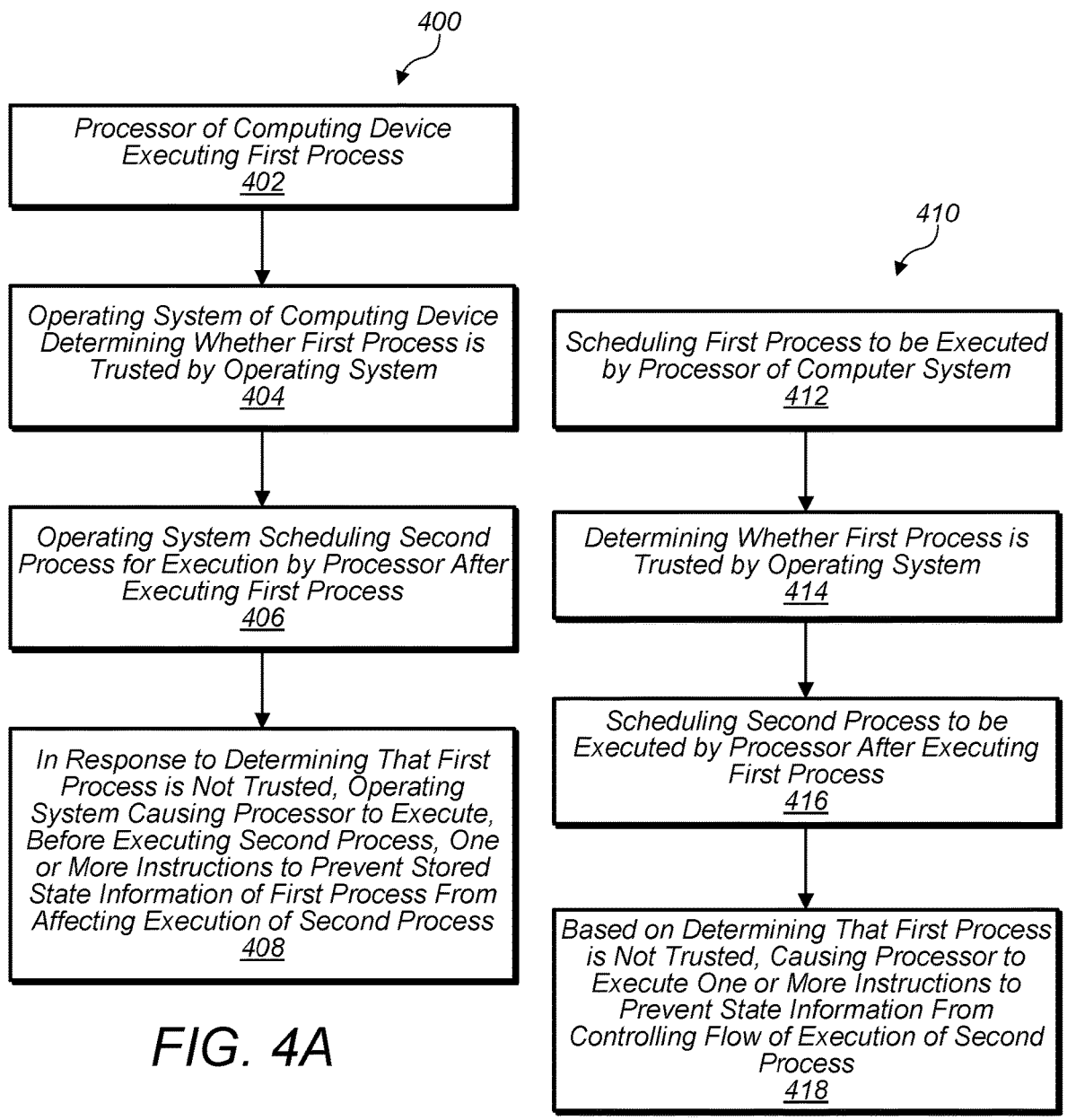

OPERATING SYSTEM APPARATUS FOR MICRO-ARCHITECTURAL STATE ISOLATION

The present application claims priority to U.S. Prov. Appl. No. 62/784,144, filed Dec. 21, 2018, which is incorporated by reference herein in its entirety.

BACKGROUND

Technical Field

This disclosure relates generally to processors, and, more specifically, to improving security for executing processes.

Description of the Related Art

Modern computer processors generally implement various techniques in an attempt to improve performance and utilization of computer resources. Such techniques may include, for example, out-of-order execution, simultaneous multithreading, and speculative execution. In speculative execution, a processor performs work (e.g., executes instructions) without knowing whether the results of that work are needed. For example, a processor may speculate about which path the flow of execution is likely to follow and then may proceed down that path before the actual path is known. In cases where the wrong path is guessed, a processor can roll back to a state prior to when it went down the wrong path and then proceeds down the correct path. In order to decrease the chance of choosing the wrong path, modern processors typically include prediction circuits that attempt to predict the execution path of a program. In some cases, the prediction circuits can be trained, based on prior execution history, to produce more accurate predictions.

BRIEF DESCRIPTION OF THE DRAWINGS

FIG. 4A-C are flow diagrams illustrating methods for preventing a process from using state information to control a flow of execution of another process, according to some embodiments.

Figure 1:
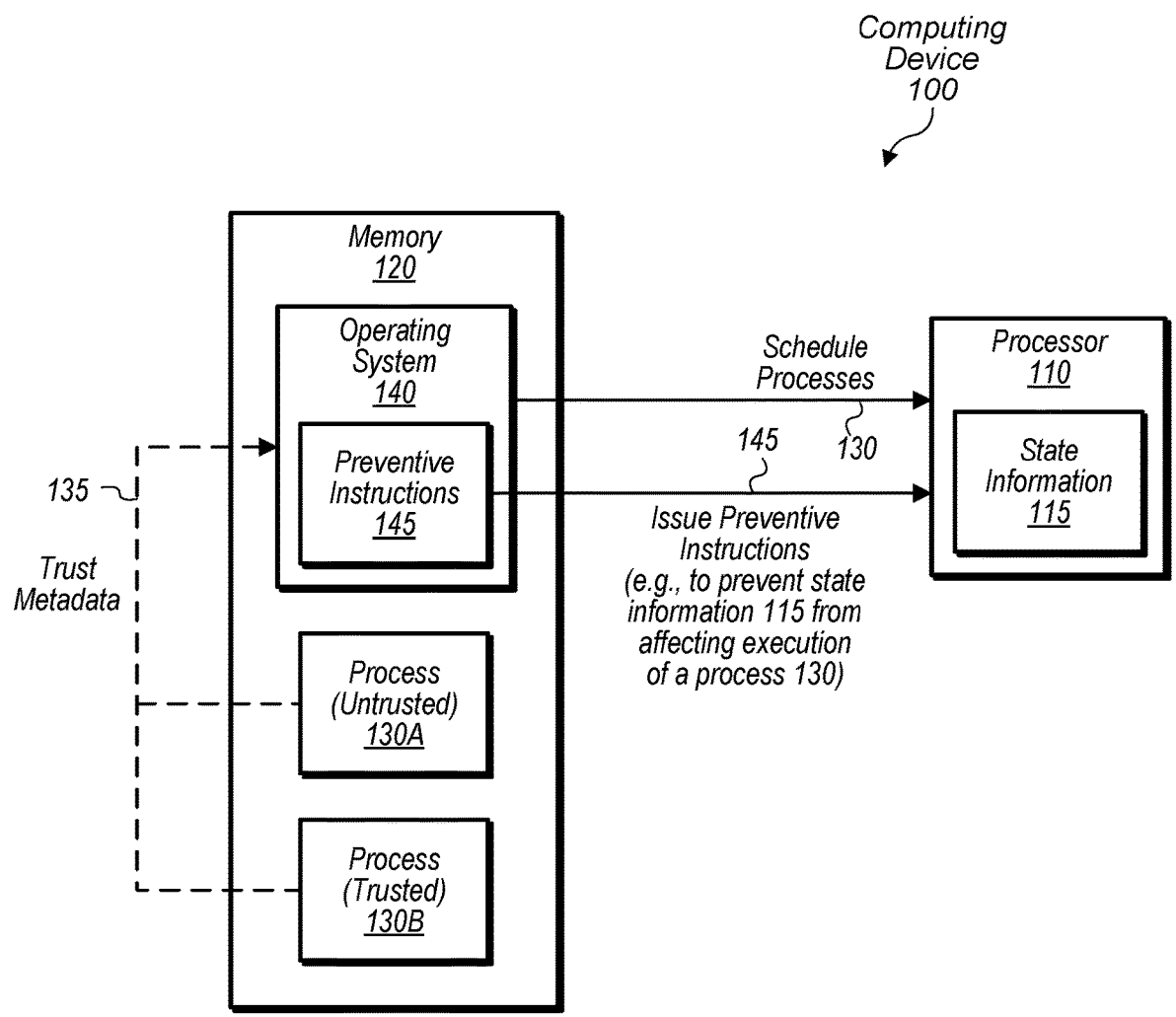
FIG. 1 is a block diagram illustrating an example of a computing device, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "processor circuit configured to execute processes" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor that executes multiple processes, the terms "first" process and "second" process can be used to refer to any one of the processes. In other words, the first and second processes are not limited to the initial two processes of a group of processes. The term "first" may also be used when only process exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

As discussed in the background section, processors may include prediction circuits that can be trained to produce more accurate predictions and thus improve the performance of those processors. In some cases, however, a malicious process may train a prediction circuit to affect the execution flow of another process in a way that changes the state of that process such that secret information is revealed. In particular, a malicious process may train a prediction circuit to cause a processor to speculatively execute instructions in a particular path of execution for another process. If the processor rolls back to a prior state after determining that the speculated path is incorrect, the processor may not clear data that was cached as a result of executing the instructions in the speculative path. A malicious process may use side-channel attacks (e.g., timing attacks that involve measuring the time taken to perform an operation) to extract information (e.g., passwords, cryptographic keys, etc.) associated with the other process. To prevent such an attack, the processor may invalidate the data used for training the prediction circuit each time it switches between processes. Because switching between processes can occur frequently, invaliding data in the prediction circuit every time can result in a heavy performance hit and is often unnecessary.

The present disclosure describes techniques for assessing whether a particular process is trusted or untrusted and, based on that assessment, permitting or preventing state information from being used to affect the flow of execution of a different process. In various embodiments described below, an operating system of a computing device schedules processes for execution by a processor that is configured to maintain state information based on the execution of those processes. In such an embodiment, the processor may include a prediction circuit configured to predict the outcomes of particular program instructions based on a history of actual outcomes for those instructions. That history may be maintained as the state information. In various embodiments, the operating system also determines whether a process is trusted. The operating system may determine whether a process is trusted based on various criteria, including whether that process is a process of the operating system and/or whether that process is attested to by a source trusted by the operating system. When scheduling a second process after scheduling a first process and determining whether that first process is trusted, in various embodiments, the operating system uses that determination to control whether the state information stored by the processor may be used by a prediction circuit in the execution of the second process. In cases where the first process is untrusted, the operating system may use one of multiple techniques to prevent state information from the first process from affecting execution of the second process. In some embodiments, the operating system may issue a set of instructions to the processor to invalidate the state information (or to disable the prediction circuit in some embodiments). In some embodiments, the operating system may alternatively schedule the second process on a different core of the processor, which has its own prediction circuit—and thus does not comingle state information of the first process executing on one core with state information of another core. Still further, in some embodiments, the operating system may elect to not schedule untrusted processes in conjunction with trusted processes—either in parallel or consecutively. For example, the operating system may schedule a block of untrusted processes in parallel before clearing state and scheduling a block of trusted processes in parallel. Said differently, the thread scheduler of the operating system may prevent co-execution of an untrusted process in parallel with a trusted process on a physical central processing unit (CPU) implementing simultaneous multi-threading (SMT). Further, in some embodiments, an untrusted process may not be permitted to execute in parallel with a trusted process on any other CPU. These measures limit exposure of micro-architectural state to untrusted processes. In some cases, in which the first process is untrusted, the operating system may determine whether the first and second processes belong to the same coalition. If they belong to the same coalition, the operating system may not issue the set of instructions or schedule the second process to a different core.

These techniques may be advantageous over approaches that always invalidate state information as the techniques described herein allow for a more fine-grained determination of when to prevent state information from affecting the flow of execution of a process. A system that implements the techniques described herein may thus obtain improved performance since the state information is not being invalidated every time the system switches to another process while also preventing a malicious process from manipulating the flow of execution of another process. A computing device implementing various ones of these techniques will now be discussed with respect to FIG. 1.

Turning now to FIG. 1, a block diagram of a computing device 100 is depicted. In the illustrated embodiment, computing device 100 includes a processor 110 and memory 120. As shown, processor 110 includes state information 115, and memory 120 includes processes 130 and an operating system 140, which includes preventive instructions 145. In some embodiments, computing device 100 may be implemented differently than shown—e.g., both processes 130 may be untrusted.

Processor 110, in various embodiments, is a processing circuit configured to execute program instructions stored in a non-transitory computer-readable medium (e.g., memory 120) in order to implement various functionality described herein. In some embodiments, processor 110 is configured to implement techniques to improve performance and utilization of computer resources, such techniques including, for example, out-of-order execution, simultaneous multi-threading, and virtualization. One particular technique discussed within the present disclosure is speculative execution.

As discussed earlier, in speculative execution, a system may perform some work before it is known whether that work is actually needed. In various cases, during execution of program instructions, processor 110 may execute certain instructions whose outcomes determine which path of execution that processor 110 should take. Before an outcome is known for one of these instructions, processor 110 may attempt to predict the correct path and then proceed executing instructions along that path. Accordingly, in various embodiments, processor 110 includes prediction circuits configured to provide predictions about which path is perceived to be the correct path. Such prediction circuits may include, for example, a branch prediction circuit and a branch target prediction circuit. In various embodiments, processor 110 includes prediction circuits that produce predictions for cases other than predicting the correct path of execution. For example, processor 110 may include a value prediction circuit such as the value tagged geometric (VTAGE) predictor that attempts to predict the results/values of an instruction before it is executed. As another non-limiting example, processor 110 may include a data prefetch prediction circuit that attempts to predict what data values should be prefetched from memory 120 and stored in a cache of processor 110.

In some embodiments, these prediction circuits are configured to use information about the outcomes of prior prediction-related instructions to produce more accurate predictions for current and upcoming instructions. For example, a prediction circuit may recognize from prior executions of a particular instruction that a certain path is taken every eighth execution of that instruction and thus predict accordingly. Consequently, in various embodiments, processor 110 maintains state information 115 (e.g., information about prior execution history) for facilitating speculative execution. State information 115 may be derived from the execution of processes 130 and used by a prediction circuit to provide predictions for each process 130. Accordingly, the execution of a given process 130 may affect state information 115 and thus the prediction provided by a prediction circuit for another process 130. As such, in some cases, a malicious process 130 may train a prediction circuit to produce certain predictions that affect the flow of execution of another process 130.

Memory 120, in various embodiments, is a non-transitory computer-readable medium configured to store program instructions that are executable by a processor 110. Memory 120 may store, for example, program instructions for processes 130 and operating system 140. In various embodiments, a process 130 is an instance of a set of software routines that may be scheduled for execution on processor 110. A process 130 may include the program instructions that makeup the set of software routines and additional information such as security attributes (e.g., process permissions) and processor state (e.g., the contents of registers). After a process 130 has been scheduled by operating system 140 for execution, processor 110 may retrieve the program instructions of that process 130 and then execute them.

Operating system 140, in various embodiments, is a set of software routines executable to manage the operations of computing device 100, including process management. In various embodiments, operating system 140 is responsible for scheduling processes 130 to execute on processor 110. Since a malicious process 130 may manipulate state information 115 (e.g., by training a prediction circuit to predict a certain way) to affect the flow of execution of another process 130, operating system 140 may take steps to prevent this issue. Accordingly, in various embodiments, operating system 140 determines a level of trust for each process 130 managed by operating system 140. In some cases, this level of trust may be binary where a process 130 is either trusted or untrusted. In other cases, there may be processes 130 that are semi-trusted as discussed in more detail with respect to FIG. 2.

In order to determine a level of trust for a given process 130, in various embodiments, operating system 140 analyzes trust metadata 135. Trust metadata 135 may specify properties of the given process 130 such as the owner of that process, certificates tied to that process, and other processes 130 that share access permissions and other properties with that process. For example, operating system 140 may determine from trust metadata 135 that a particular process 130 is a process implementing operating system 140 and thus is trustworthy. In various cases, a particular process 130 may be attested to be trusted via the certificates specified in metadata 135. Such certificates may be signed by a source trusted by operating system 140. For example, an owner of an application store may review applications that are submitted to the store and cryptographically sign those application that are approved. Accordingly, operating system 140 may determine that a process 130 of a particular application is trustworthy since the application has be signed by the owner of the store who is trusted.

In various embodiments, operating system 140 determines the level of trust for a given process 130 prior to scheduling another process 130 for execution after that given process. In response to determining that a given process 130 is untrusted, operating system 140 may cause processor 110 to execute preventive instructions 145. In various cases, preventive instructions 145 may cause state information 115 to be invalidated (e.g., a flag may be set that causes state information 115 to be disregarded, state information 115 may be deleted, etc.). In some cases, preventive instructions 145 may cause a prediction circuit that utilizes state information 115 to be disable during the execution of the process that follows the untrusted process. In some embodiments, preventive instructions 145 may include instructions pertaining to the scheduling of processes 130 such as instructions that cause processes 130 to be scheduled on separate processor cores, that cause processes 130 to not be scheduled in parallel or concurrently, etc. Accordingly, by issuing preventive instructions 145, operating system 140 may prevent state information 115 from being used to affect the execution of a process 130 in a malicious manner.

In the example depicted in FIG. 1, operating system 140 manages the scheduling of two processes 130A and 130B. In this example, process 130A is a malicious process implementing a text editor application, and process 130B is a non-malicious process implementing, for example, a browser that stores passwords. After operating system 140 schedules process 130A for execution on a processor 110, that processor may execute the instructions of process 130A. Such instructions may train a prediction circuit of processor 110 to predict a certain way such that, after execution of process 130B, process 130A might be able to use side-channel attacks to collect information about process 130B such as seizing a key used to encrypt passwords stored by the browser. Accordingly, prior to scheduling process 130B for execution, operating system 140 may determine whether process 130A is trusted. Operating system 140 may discern that process 130A is untrusted based on process 130A not being attested to be trusted by a trusted source or not being a process of operating system 140. In response to determining that process 130A is untrusted, operating system 140 may issue preventive instructions 145 to prevent the training of the prediction circuit (e.g., state information 115) from affecting the flow of execution of process 130B in the manner mentioned directly above. Accordingly, such instructions may disable the prediction circuit or invalidate its training.

Implementing a computing device 100 in this manner may be advantageous as it may prevent a malicious process 130 from affecting the flow of execution of a different process in order to get at information privileged to that different process. Additionally, computing device 100 may not incur the cost of invalidating state information 115 for every switch between two processes. The particulars of operating system 140 will now be discussed with respect to FIG. 2.

Figure 2:
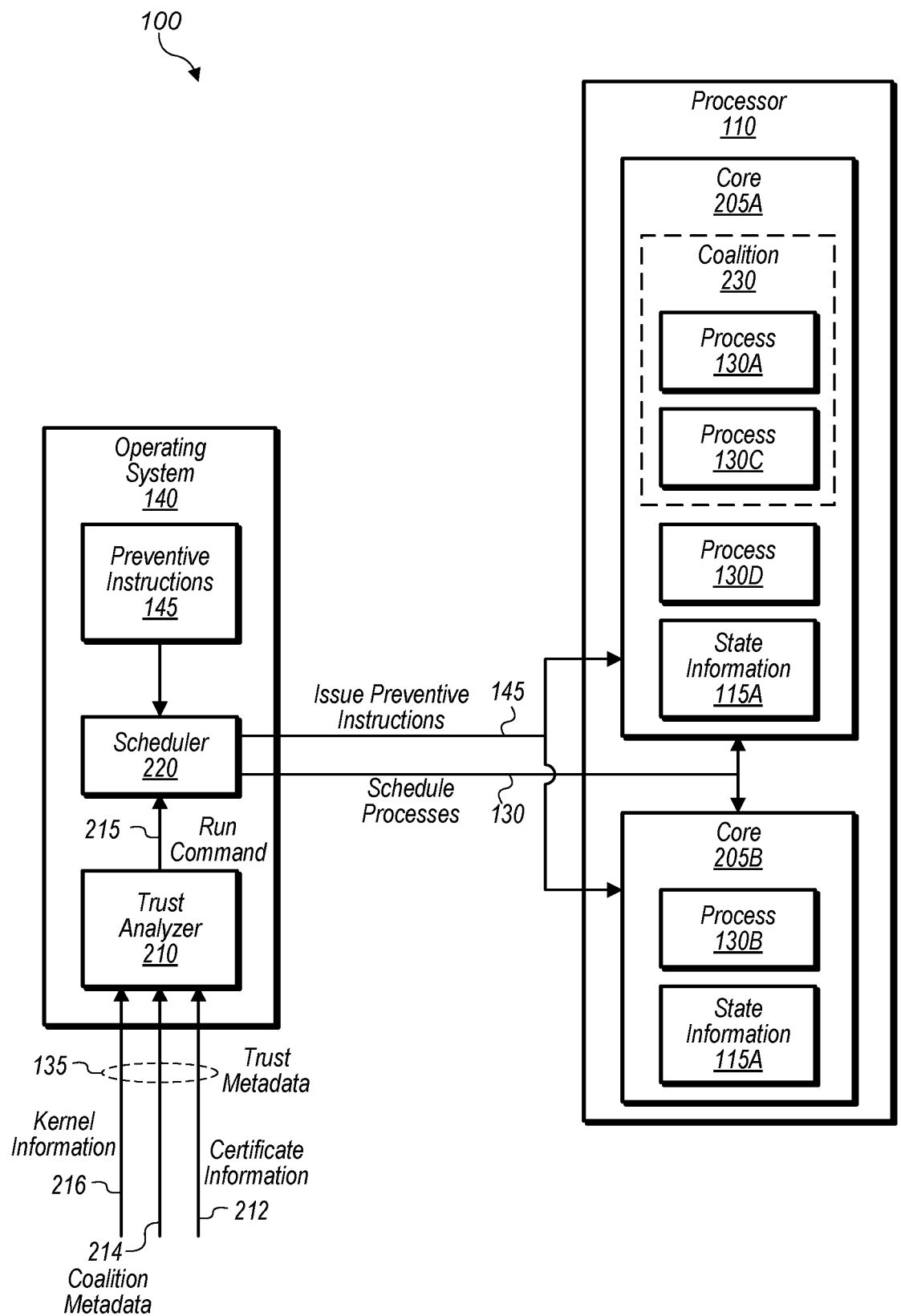
FIG. 2 is a block diagram illustrating an example of an operating system, according to some embodiments.

Turning now to FIG. 2, a block diagram of an interaction between processor 110 and operating system 140 is depicted. In the illustrated embodiment, processor 110 includes two separate physical cores 205 that each have respective state information 115 and are configured to execute one or more processes 130. In such an embodiment, cores 205 have distinct hardware such as separate register groups, separate predictors, separate L1 caches, separate translation lookaside buffers (TLBs), etc. In various embodiments, the respective state information 115 for a given core 205 is determined based on the particular processes 130 that are executed by that core 205. The respective state information 115 for a given core 205 may not be used by a different core 205 when executing processes 130. As further shown, operating system 140 includes a trust analyzer 210 and a scheduler 220. In some embodiments, processor 110 and/or operating system 140 may be implemented differently than shown—e.g., cores 205 may share state information 115.

Trust analyzer 210, in various embodiments, is a set of software routines executable to analyze the trusts of processes 130 and provide, based on its analysis of processes 130, run commands 215 to scheduler 220 in order to trigger the execution of preventive instructions 145. In some cases, run commands 215 may cause scheduler 220 to schedule a process 130 to a different core 205 than the particular core 205 that is executing an untrusted process 130. In other cases, run commands 215 may be issued to cause processor 110 to not execute untrusted processes 130 in parallel with trusted processes 130. In still other cases, run commands 215 may be issued to scheduler 220 to minimize the number of transitions from untrusted processes 130 to trusted processes 130. For example, analyzer 210 may determine that a first process is untrusted and delay scheduling a second trusted process 130 by scheduling one or more additional untrusted processes 130 between the first and second processes 130 in order to minimize the number of transitions. In such an example, analyzer 210 may then cause state information 115 to be cleared before executing the second trusted process 130 and one or more additional trusted processes 130; however, this clearing is performed once rather than multiple times. Trust analyzer 210 may provide run command 215 in association with the scheduling of a given process 130 in response to determining that a different process 130 (which the given process will follow in execution) is untrusted and that the two processes 130 are not part of the same coalition 230 as discussed below. In various embodiments, analyzer 210 uses trust metadata 135, which includes certificate information 212, coalition information 214, and kernel information 216, to make that determination.

Certificate information 212, in various embodiments, specifies a digital signature for a given application. The digital signature may include a digital certificate and a set of encrypted checksums generated by hashing various portions of code for that given application. In various embodiments, the digital certificate specifies a public key for decrypting the set of encrypted checksums and information identifying the signer (who encrypted the set of checksums) such as the signer's name, a company name, a domain name, etc. In some embodiments, the digital certificate is cryptographically signed by a trusted authority who attests to validity of the digital certificate and thus the identity of the application.

When determining a level of trust for a given process 130, in some embodiments, trust analyzer 210 generates a set of checksums by performing the same hash derivation function (used in generating the checksums for the digital signature) on code associated with the given process 130. Trust analyzer 210 may then compare the set of hashes (or checksums) included in the digital signature against the generated set. In order to do that, trust analyzer 210 may verify that the digital certificate was signed by a trusted authority using a public key provided by that authority. Trust analyzer 210 may then use the same public key (or a separate one) to decrypt the set of encrypted hashes. Thereafter, trust analyzer 210 may compare the generated set of hashes to the decrypted set of hashes (or checksums) to determine if they match. If the two sets match, then the code associated with the given process 130 has not been modified; if they do not match, then the code has been altered. Accordingly, trust analyzer 210 may determine that a process is trusted if its code has not been modified and the authority that signs the digital certificate is trusted by operating system 140. Note that the trusted authority may review an application for malicious code and then afterwards, sign the encrypted hashes of that application to attest that that version of the application is clean (at least with a high likelihood).

Coalition information 214, in various embodiments, indicates whether two particular processes 130 are part of the same coalition 230. A coalition 230, in various embodiments, is a group of processes 130 that share certain properties that allows a given process 130 to access information handled by another process 130 in that group. For example, a parent process and its children may be part of the same coalition 230 as they may share memory segments. Thus, even if a parent process were to train a prediction circuit that affected the flow of execution of one of its children processes, the parent process would not learn any information that it did not already know or have access to. In other words, if privileged information did leak to the parent, such leaking would likely be inconsequential since the parent process may already have the privileges to access that information anyway. Accordingly, in various embodiments, when two processes 130 (where one is scheduled to execute after the other on the same core 205) are determined to be part of the same coalition 230, trust analyzer 210 does not provide run command 215 to scheduler 220.

Kernel information 216, in various embodiments, indicates whether a particular process 130 is a process of operating system 140. Such processes 130 may include, for example, kernel processes, driver processes, networking processes, security processes, etc. Kernel information 216 may also identify processes 130 that are packaged with operating system 140—e.g., a mail application developed by the provider of operating system 140. In various embodiments, trust analyzer 210 determines that a process 130 is trusted if it is indicated by kernel information 126.

In some embodiments, trust analyzer 210 might determine that a process 130 is semi-trusted. In such cases, trust analyzer 210 may determine that a process 130 itself is trusted, but that that process 130 handles foreign code that might not be trusted. As an example, a process 130 that implements part of a web browser application may serve to interpret or compile code on the fly received from a web server. While that process 130 may not be malicious, the code that it interprets might be. As such, in some embodiments, when trust analyzer 210 determines (e.g., via trust metadata 135 indicating that a process 130 is part of an interpreter) that a process 130 is semi-trusted, trust analyzer 210 may provide run command 215 to cause execution of a set of preventive instructions 145 that disable the prediction circuit during the execution of the process 130 that follows that original process instead of invalidating state information 115.

There are other cases where trust analyzer 210 might cause the prediction circuit to be disabled instead of invaliding state information 115. In some cases, processor 110 may briefly switch between two processes 130. For example, an untrusted process 130 may issue a system call that requires action by operating system 140. The system call may be handled quickly and thus it may be desirable to not invalidate state information 115 as processor 110 will quickly return to executing the untrusted process 130. Note that an untrusted process is not necessarily a malicious process and thus invalidating state information 115 for a quick turnaround between processes 130 might unnecessarily hinder performance.

Scheduler 220, in various embodiments, is a set of software routines that are executable to schedule processes 130 for execution on cores 205. When scheduling a given process 130, scheduler 220 may receive a run command 215 from trust analyzer 210. Based on the type of run command 215, scheduler 220 may provide preventive instructions 145 that invalidate state information 115, provide preventive instructions 145 that disable a prediction circuit, and/or schedule a given process 130 to a different core 205. In some embodiments, when scheduling an untrusted process to be executed after a trusted process, scheduler 220 may receive a run command 215 to invalidate state information 115 or disable a prediction circuit of processor 110.

In the example depicted in FIG. 4, scheduler 220 may schedule four processes 130A-D to be executed by cores 205. Scheduler 220 may first schedule process 130A to be executed on core 205A. When (or prior to) scheduling process 130B, scheduler 220 may receive a run command 215 indicating that process 130A is untrusted and that scheduler 220 should schedule the next process 130 (i.e., process 130B) to a different core 205 or provide preventive instructions 145 to core 205A. In response to determining that core 205B has available processing capacity for more processes 130, scheduler 220 may schedule process 130B to that core. When scheduling process 130C, scheduler 220 may not receive a run command 215 as processes 130A and 130C are part of the same coalition 230. Thus, scheduler 220 may schedule process 130C to the same core 205 as process 130A without providing preventive instructions 145. When (or prior to) scheduling process 130D, scheduler 220 may receive a run command 215 if process 130C is determined to be untrusted by trust analyzer 210. In some embodiments, scheduler 220 may receive a run command 215 even if process 130 is trusted since process 130A is untrusted. As such, when scheduling process 130D to execute on core 205A, scheduler 220 may cause core 205A to execute preventive instructions to invalidate state information 115A (not 115B) or to disable a prediction circuit of core 205A that uses state information 115A. The particulars of processor 110 will now be discussed with respect to FIG. 3.

Figure 3:
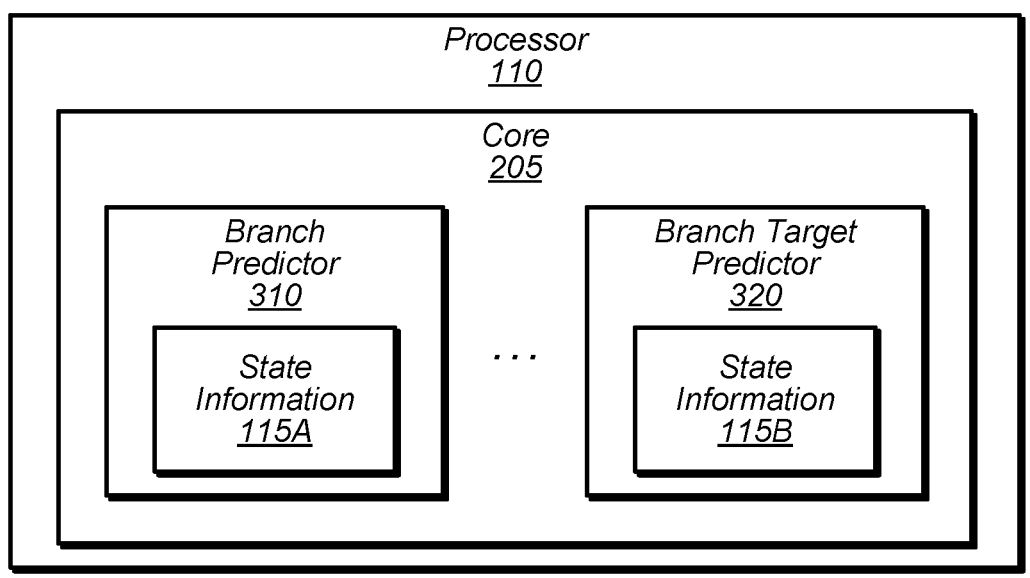
FIG. 3 is a block diagram illustrating an example of a processor, according to some embodiments.

Turning now to FIG. 3, a block diagram of a processor 110 is depicted. In the illustrated embodiment, processor 110 includes a core 205 having a branch predictor 310 and a branch target predictor 320. As further depicted, predictors 310 and 320 each include respective state information 115. In some cases, state information 115 may be stored in a storage element (e.g., a cache) of a prediction circuit; in other cases, state information 115 may be stored elsewhere but fed into the prediction circuit when a prediction is requested. In various embodiments, processor 110 may be implemented differently than shown. For example, processor 110 may include additional types of predictors such as value-based predictors.

Branch predictor 310, in various embodiments, is configured to determine a direction that a branch will most likely take along an execution path before it is definitively known. For example, a branch instruction may assert that if two values are equal, then core 205 should jump to a particular instruction. In such an example, branch predictor 310 may use state information 115A to determine whether those two values are likely to be equal. In various embodiments, state information 115A may include history information that indicates actual outcomes for previous executions for a given branch instruction. Returning to the previous example, branch predictor 310 may determine from state information 115A that the two values are rarely equal and thus core 205 has historically not jumped at the particular branch instruction. Accordingly, branch predictor 310 may cause core 205 to speculatively execute down the particular path where core 205 does not jump. In various embodiments, preventive instructions 145 may cause core 205 to invalidate state information 115A or to disable branch predictor 310 during the execution of a particular process 130.

Branch target predictor 320, in various embodiments, is configured to determine a branch target address (e.g., where to jump if a jump is to occur) before it is definitively known. Returning to the above example, branch predictor 310 may assert that core 205 should jump to a particular instruction and branch target predictor 320 may define what that particular instruction is. Accordingly, in some embodiments, branch target predictor 320 uses state information 115B that indicates prior locations for a jump to predict where to cause core 205 to jump. In various embodiments, preventive instructions 145 may cause core 205 to invalidate state information 115B or to disable branch target predictor 320 during the execution of a particular process 130.

Turning now to FIG. 4A, a flow diagram of a method 400 is depicted. Method 400 is one embodiment of a method performed by components of a computing device (e.g., computing device 100) such as processor 110 and operating system 140 to prevent a process (e.g., process 130) from using state information (e.g., state information 115) to control a flow of execution of another process. In some embodiments, method 400 may include additional steps—e.g., the operating system may schedule processes to different cores.

Method 400 begins in step 402 with a processor of a computing device executing a first process (e.g., process 130A). The executing by the processor may include the processor storing state information usable to facilitate speculative execution of the first process. In some embodiments, the state information is be maintained by a prediction circuit (e.g., predictors 310 or 320) of the processor that is configured to predict an outcome of an instruction being executed by the processor.

In step 404, an operating system of the computing device determines whether the first process is trusted by the operating system. In some cases, the operating system may determine whether the first process is trusted by determining whether the first process is associated with a certificate signed by a source trusted by the operating system. The operating system may also determine whether the first process is trusted by determining whether the first process is a process of the operating system.

In step 406, the operating system schedules a second process (e.g., process 130B) for execution by the processor after executing the first process. The operating system may, in some embodiments, schedule the second process to be executed by a different core than the one that is executing instructions for the first process.

In step 408, in response to determining that the first process is not trusted, the operating system causes the processor to execute one or more instructions (e.g., preventive instructions 145) before executing the second process. The one or more instructions may prevent the stored state information of the first process from affecting execution of the second process. In some cases, the execution of the one or more instructions may cause the state information maintained by the prediction circuit to be invalidated. In some cases, the execution of the one or more instructions may cause the prediction circuit to be disabled during execution of the second process such that the prediction circuit does not predict an outcome for an instruction executed for the second process. In some embodiments, the causing includes scheduling a third process to execute between to the first process and the second process.

In various embodiments, prior to causing the processor to execute the one or more instructions, the operating system may determine whether to cause the processor to execute one or more instructions to disable the prediction circuit or to execute one or more instructions to invalidate the state information maintained by the prediction circuit. Based on the second process being scheduled in response to a system call issued by the first process, the operating system may determine to cause the processor to execute the one or more instructions to disable the prediction circuit.

Turning now to FIG. 4B, a flow diagram of a method 410 is depicted. Method 410 is one embodiment of a method performed by an operating system (e.g., operating system 140) of a computer system (e.g., computing device 100) to prevent a process (e.g., process 130) from using state information (e.g., state information 115) to control a flow of execution of another process. In various embodiments, method 410 is performed by the computer system executing program instructions that are stored on a non-transitory computer-readable medium (e.g., memory 120). In some embodiments, method 410 may include additional steps—e.g., the operating system may schedule processes to different cores.

Method 410 begins in step 412 with the operating system scheduling a first process (e.g., process 130A) to be executed by a processor (e.g., processor 110) of the computer system. In various embodiments, the processor is configured to maintain state information determined based on the execution of the first process. The state information may be used to control a flow of execution of the first process;

In step 414, the operating system determines whether the first process is trusted by the operating system. In some cases, the operating system may determine whether the first process is trusted by generating one or more hash values (e.g., by performing a hash derivation function on a set of program instructions corresponding to the first process). The operating system may then determine whether the one or more hash values match one or more hash values associated with certificate information of the first process. In some cases, the certificate information may be cryptographically signed by a source trusted by the operating system. In some cases, the operating system determining whether the first process is trusted by determining whether the first process is attested to be a trusted process by a source external to the operating system and trusted by the operating system.

In step 416, the operating system schedules a second process (e.g., process 130B) to be executed by the processor after executing the first process.

In step 418, based on determining that the first process is not trusted, the operating system causes the processor to execute one or more instructions (e.g., preventive instructions 145) to prevent the state information from controlling a flow of execution of the second process. In some embodiments, the operating system determines whether the first and second processes share a parent-child relationship (i.e., part of the same coalition 230). The operating system causing the processor to execute the one or more instructions may be based on the first and second processes not sharing a parent-child relationship. In various embodiments, the operating system determines whether to cause the processor to execute one or more instructions to disable a prediction circuit of the processor that maintains the state information or to execute one or more instructions to invalidate the state information. Based on an estimated amount of time of execution of the second process satisfying a threshold amount of time, the operating system may cause the processor to execute the one or more instructions to disable the prediction circuit. Based on an estimated amount of time of execution of the second process not satisfying a threshold amount of time, the operating system may cause the processor to execute the one or more instructions to invalidate the state information.

In various embodiments, the processor is configured to maintain state information that is determined based on an execution of the second process. In various instances, the operating system may determine whether the second process is trusted by the operating system. The operating system may schedule a third process to be executed by the processor after executing the second process. Based on determining that the second process is trusted, the operating system may permit the processor to use the state information that was determined based on the execution of the second process to affect a flow of execution of the third process.

Figure 4C:
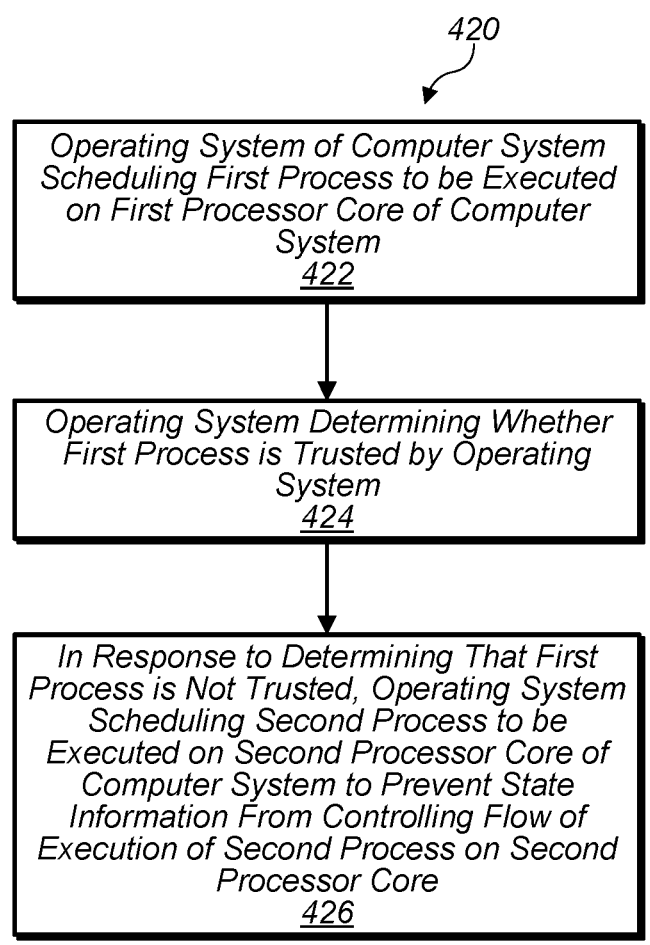

Turning now to FIG. 4C, a flow diagram of a method 420 is depicted. Method 420 is one embodiment of a method performed by an operating system (e.g., operating system 140) of a computer system (e.g., computing device 100) to prevent a process (e.g., process 130) from using state information (e.g., state information 115) to control a flow of execution of another process. In some embodiments, method 420 may include additional steps—e.g., the operating system may determine whether two processes are part of the same group (i.e., the same coalition 230).

Method 420 begins in step 422 with the operating system scheduling a first process to be executed on a first processor core of the computer system. In various embodiments, the first processor core is configured to maintain state information that is determined based on an execution of the first process and is usable to control a flow of execution of processes that are executed on the first processor core.

In step 424, the operating system determines whether the first process is trusted by the operating system. In some cases, the operating system may determine whether the first process is trusted by determining whether the first process is a process of the operating system.

In step 426, in response to determining that the first process is not trusted, the operating system schedules a second process to be executed on a second processor core of the computer system to prevent the state information from controlling a flow of execution of the second process on the second processor core.

In various cases, the operating system may schedule a third process for execution by the first processor core after executing the first process. In response to scheduling the third process to the same processor core as the first process and to determining that the first process is not trusted, the operating system may cause the first processor core to execute one or more instructions to prevent the state information that is maintained by the first processor core from controlling a flow of execution of the third process. The state information may be maintained by a branch prediction circuit of the first processor core. In some embodiments, the state information is maintained as history prediction information that indicates actual outcomes for previous branch instructions. In some cases, the execution of the one or more instructions may cause the state information to be invalidated at the branch prediction circuit. In some cases, the execution of the one or more instructions causes the branch prediction circuit to be disabled.

Exemplary Computer System

Figure 5:
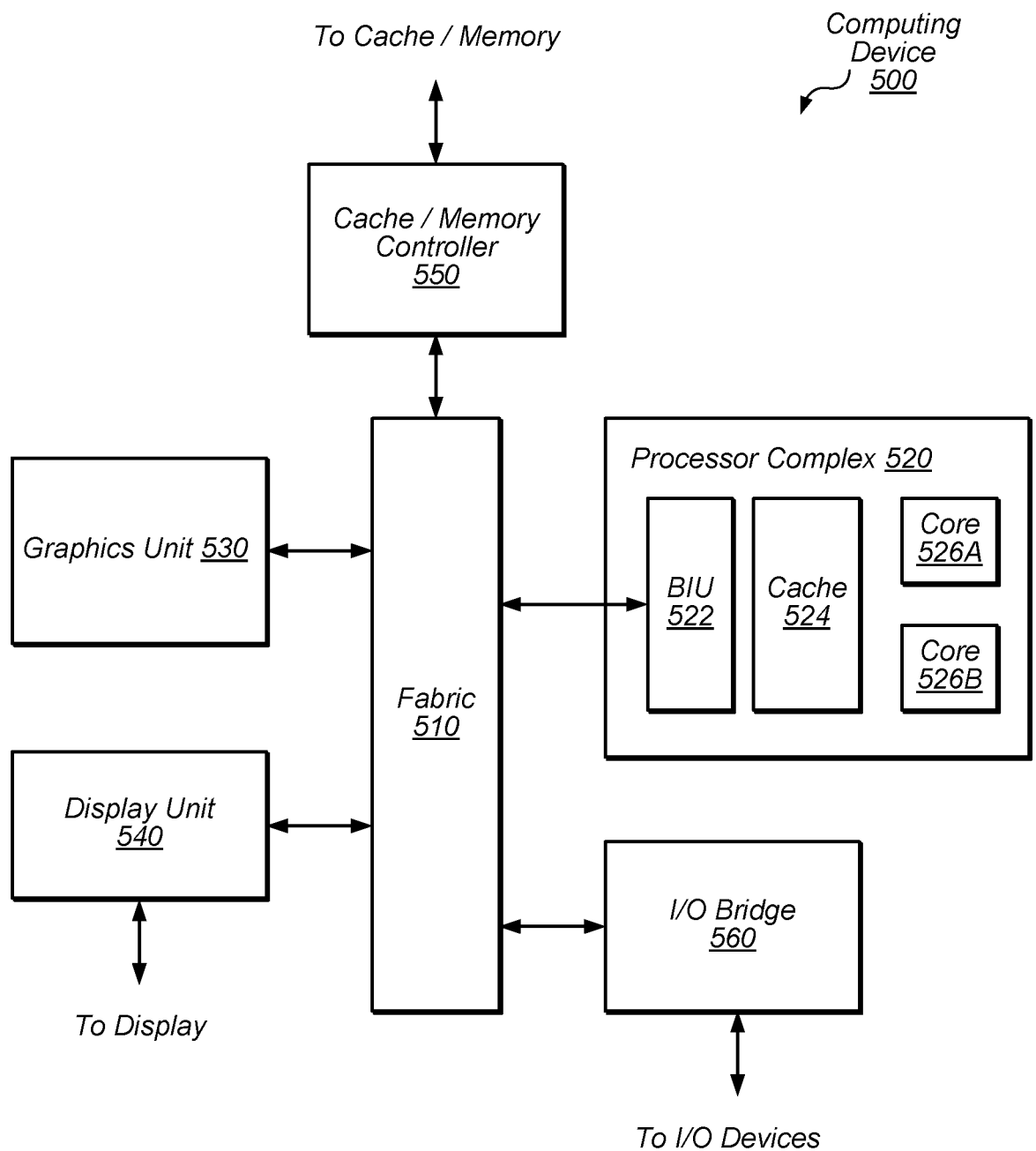
FIG. 5 is a block diagram illustrating an example of a computer system, according to some embodiments.

Turning now to FIG. 5, a block diagram illustrating an exemplary embodiment of a computing device 500, which may implement functionality of computing device 100, is shown. Device 500 may correspond to any suitable computing device such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, etc. In the illustrated embodiment, device 500 includes fabric 510, processor complex 520, graphics unit 530, display unit 540, cache/memory controller 550, input/output (I/O) bridge 560. In some embodiments, elements of device 500 may be included within a system on a chip (SOC).

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally. As used herein, the term "coupled to" may indicate one or more connections between elements, and a coupling may include intervening elements. For example, in FIG. 5, graphics unit 530 may be described as "coupled to" a memory through fabric 510 and cache/memory controller 550. In contrast, in the illustrated embodiment of FIG. 5, graphics unit 530 is "directly coupled" to fabric 510 because there are no intervening elements.

In the illustrated embodiment, processor complex 520 includes bus interface unit (BIU) 522, cache 524, and cores 526A and 526B. In various embodiments, processor complex 520 may include various numbers of processors, processor cores and/or caches. For example, processor complex 520 may include 1, 2, or 4 processor cores, or any other suitable number. In one embodiment, cache 524 is a set associative L2 cache. In some embodiments, cores 526A and/or 526B may include internal instruction and/or data caches. In some embodiments, a coherency unit (not shown) in fabric 510, cache 524, or elsewhere in device 500 may be configured to maintain coherency between various caches of device 500. BIU 522 may be configured to manage communication between processor complex 520 and other elements of device 500. Processor cores such as cores 526 may be configured to execute instructions of a particular instruction set architecture (ISA), which may include operating system instructions and user application instructions. These instructions may be stored in computer readable medium such as a memory coupled to memory controller 550 discussed below. In some embodiments, processor complex 520 corresponds to processor 110.

Graphics unit 530 may include one or more processors and/or one or more graphics processing units (GPU's). Graphics unit 530 may receive graphics-oriented instructions, such as OPENGL®, Metal, or DIRECT3D® instructions, for example. Graphics unit 530 may execute specialized GPU instructions or perform other operations based on the received graphics-oriented instructions. Graphics unit 530 may generally be configured to process large blocks of data in parallel and may build images in a frame buffer for output to a display. Graphics unit 530 may include transform, lighting, triangle, and/or rendering engines in one or more graphics processing pipelines. Graphics unit 530 may output pixel information for display images.

Display unit 540 may be configured to read data from a frame buffer and provide a stream of pixel values for display. Display unit 540 may be configured as a display pipeline in some embodiments. Additionally, display unit 540 may be configured to blend multiple frames to produce an output frame. Further, display unit 540 may include one or more interfaces (e.g., MIPI® or embedded display port (eDP)) for coupling to a user display (e.g., a touchscreen or an external display).

Cache/memory controller 550 may be configured to manage transfer of data between fabric 510 and one or more caches and/or memories. For example, cache/memory controller 550 may be coupled to an L3 cache, which may in turn be coupled to a system memory. In other embodiments, cache/memory controller 550 may be directly coupled to a memory. In some embodiments, cache/memory controller 550 may include one or more internal caches. Memory coupled to controller 550 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 550 may be any type of non-volatile memory such as NAND flash memory, NOR flash memory, nano RAM (NRAM), magneto-resistive RAM (MRAIVI), phase change RAM (PRAM), Racetrack memory, Memristor memory, etc. As noted above, this memory may store program instructions executable by processor complex 520 to cause device 500 to perform functionality described herein. In some embodiments, this memory corresponds to memory 120.

I/O bridge 560 may include various elements configured to implement universal serial bus (USB) communications, security, audio, and/or low-power always-on functionality, for example. I/O bridge 560 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 560. For example, these devices may include various types of wireless communication (e.g., Wi-Fi, Bluetooth, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
  a processor of a computing device executing a first process, wherein the executing includes the processor storing state information usable to facilitate speculative execution of the first process;

an operating system of the computing device determining whether the first process is trusted by the operating system;

the operating system scheduling a second process for execution by the processor after executing the first process; and in response to determining that the first process is not trusted, the operating system causing the processor to execute one or more instructions before executing the second process, wherein the one or more instructions prevent the processor from predicting an outcome of an instruction of the second process based on the stored state information of the first process.

2. The method of claim 1, wherein the state information is maintained by a prediction circuit of the processor, wherein the prediction circuit is configured to predict an outcome of an instruction being executed.

3. The method of claim 2, wherein execution of the one or more instructions causes the state information maintained by the prediction circuit to be invalidated.

4. The method of claim 2, wherein execution of the one or more instructions causes the prediction circuit to be disabled during execution of the second process such that the prediction circuit does not predict an outcome for an instruction executed for the second process.

5. The method of claim 4, further comprising:

prior to causing the processor to execute the one or more instructions, the operating system determining whether to 1) cause the processor to execute the one or more instructions to disable the prediction circuit or 2) execute one or more instructions to invalidate the state information that is maintained by the prediction circuit, wherein, based on the second process being scheduled in response to a system call issued by the first process, the operating system determines to cause the processor to execute the one or more instructions to disable the prediction circuit.

6. The method of claim 1, wherein the causing includes scheduling a third process to execute between to the first process and the second process.

7. The method of claim 1, wherein determining whether the first process is trusted includes the operating system determining whether the first process is associated with a certificate signed by a source trusted by the operating system.

8. The method of claim 1, wherein determining whether the first process is trusted includes determining whether the first process is a process of the operating system.

9. A non-transitory computer-readable medium having program instructions stored thereon that are executable by a computer system to implement an operating system that performs operations comprising:

scheduling a first process to be executed by a processor of the computer system, wherein the processor is configured to maintain state information determined based on an execution of the first process and is usable to control a flow of execution of the first process;

determining whether the first process is trusted by the operating system;

scheduling a second process to be executed by the processor after executing the first process; and based on determining that the first process is not trusted, causing the processor to execute one or more instructions to prevent the state information from controlling a flow of execution of the second process.

10. The non-transitory computer-readable medium of claim 9, wherein the operations further comprise:

determining whether the first and second processes share a parent-child relationship, wherein causing the processor to execute the one or more instructions is based on the first and second processes not sharing a parent-child relationship.

11. The non-transitory computer-readable medium of claim 9, wherein determining whether the first process is trusted includes:

generating one or more hash values by performing a hash derivation function on a set of program instructions corresponding to the first process; and determining whether the one or more hash values match one or more hash values associated with certificate information of the first process, wherein the certificate information is cryptographically signed by a source trusted by the operating system.

12. The non-transitory computer-readable medium of claim 9, wherein the processor is configured to maintain state information that is determined based on an execution of the second process, and wherein the operations further comprise:

determining whether the second process is trusted by the operating system;

scheduling a third process to be executed by the processor after executing the second process; and based on determining that the second process is trusted, permitting the processor to use the state information determined based on the execution of the second process to affect a flow of execution of the third process.

13. The non-transitory computer-readable medium of claim 9, wherein the operations further comprise:

determining an estimated amount of time of execution of the second process; and based on the determined estimated amount of time not satisfying a threshold amount of time, determining to cause the processor to execute one or more instructions to disable a prediction circuit of the processor that maintains the state information.

14. The non-transitory computer-readable medium of claim 9, wherein determining whether the first process is trusted includes determining whether the first process is attested to be a trusted process by a source that is external to the operating system and is trusted by the operating system.

15. A method, comprising:

an operating system of a computer system scheduling a first process to be executed on a first processor core of the computer system, wherein the first processor core is configured to maintain state information that is determined based on an execution of the first process and is usable to predict a flow of execution of processes that are executed on the first processor core;

the operating system determining whether the first process is trusted by the operating system; and in response to determining that the first process is not trusted, the operating system scheduling a second process to be executed on a second processor core of the computer system to prevent the state information from controlling a flow of execution of the second process on the second processor core.

16. The method of claim 15, further comprising:

the operating system scheduling a third process for execution by the first processor core after executing the first process; and in response to scheduling the third process to the same processor core as the first process and to determining that the first process is not trusted, the operating system causing the first processor core to execute one or more instructions to prevent the state information maintained by the first processor core from controlling a flow of execution of the third process.

17. The method of claim 16, wherein the state information is maintained by a branch prediction circuit of the first processor core, and wherein execution of the one or more instructions causes the state information to be invalidated at the branch prediction circuit.

18. The method of claim 16, wherein the state information is maintained by a branch prediction circuit of the first processor core and is used by the branch prediction circuit to produce predictions, and wherein execution of the one or more instructions causes the branch prediction circuit to be disabled.

19. The method of claim 15, wherein the state information is maintained, by a branch prediction circuit of the first processor core, as history prediction information that indicates actual outcomes for previous branch instructions, wherein the branch prediction circuit is configured to produce a prediction, based on the history prediction information, that is usable to determine a particular path of execution for a given process.

20. The method of claim 15, wherein determining whether the first process is trusted includes determining whether the first process is a process of the operating system.

* * * * *